Oct. 2, 1956 R. G. FERRIS 2,764,960
ANIMAL OPERATED WATER BOWL
Filed March 18, 1955 3 Sheets-Sheet 1
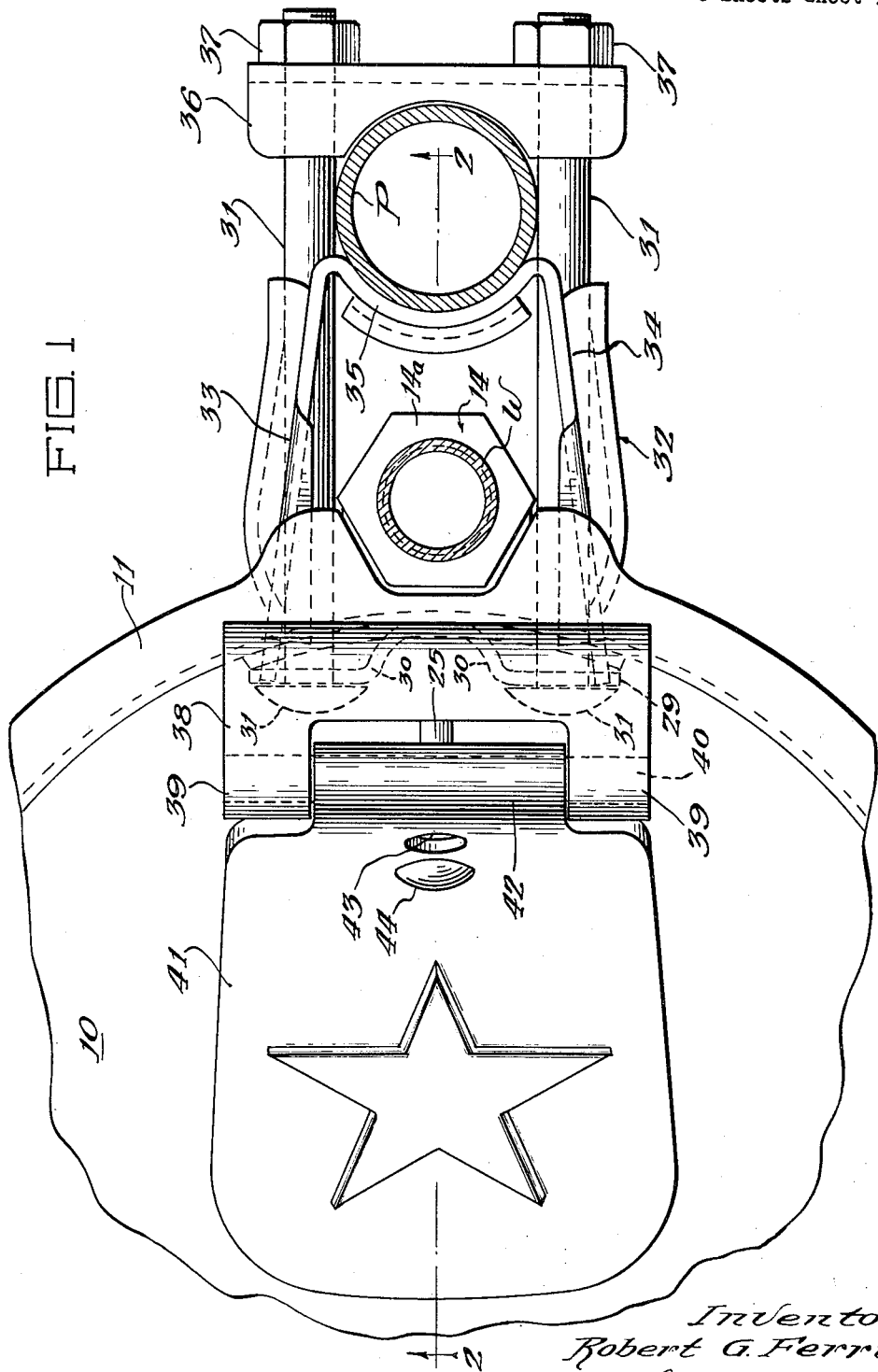
Inventor:
Robert G. Ferris
By: Schroeder, Hofgren,
Brady & Wegner
Attorneys

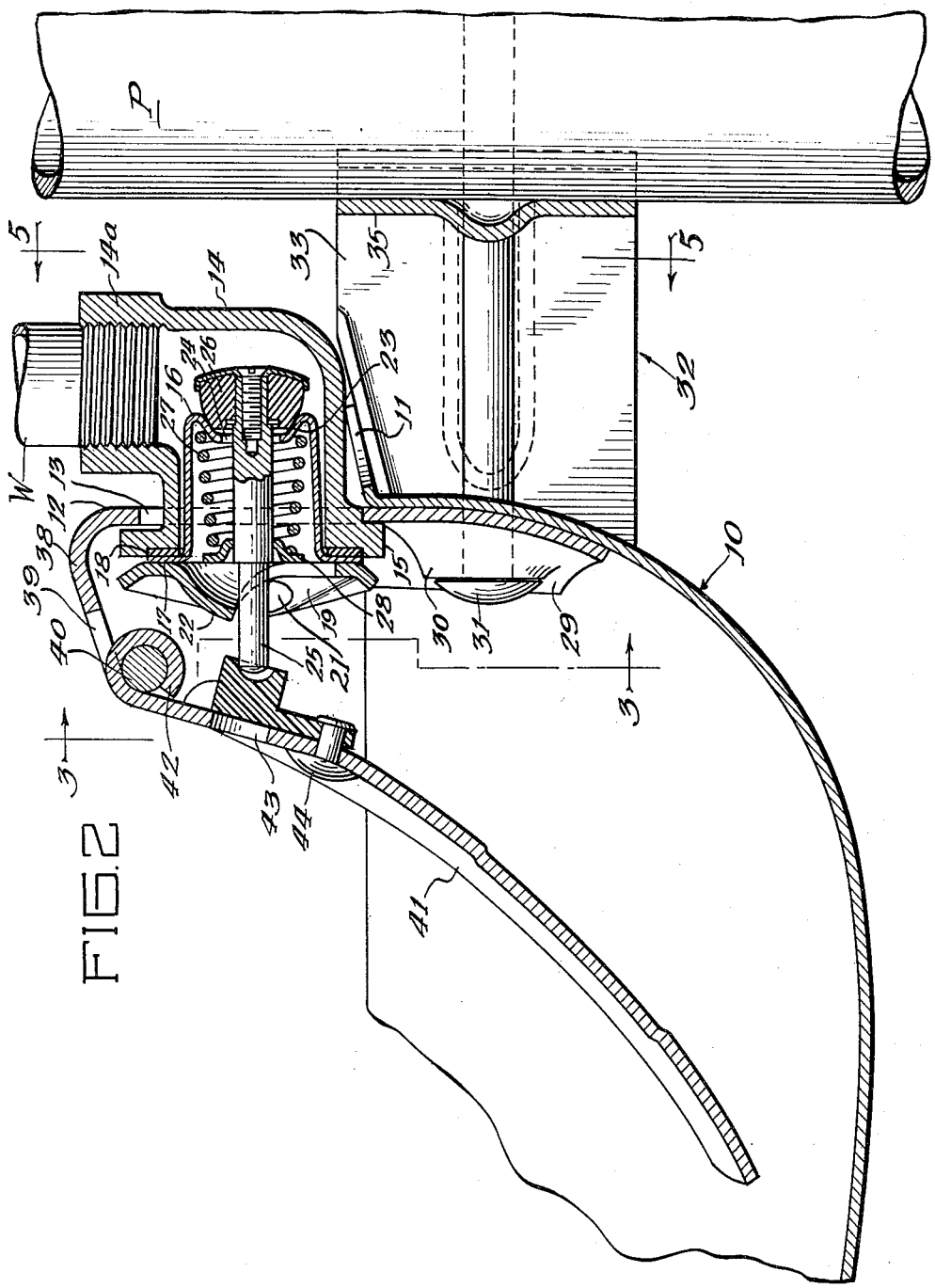

Oct. 2, 1956    R. G. FERRIS    2,764,960
ANIMAL OPERATED WATER BOWL
Filed March 18, 1955    3 Sheets-Sheet 3
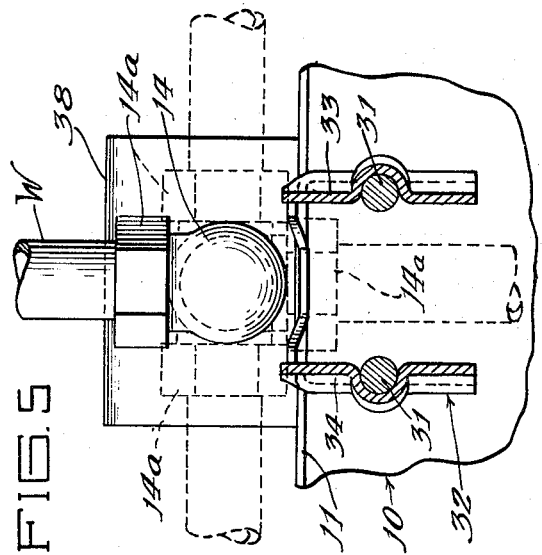
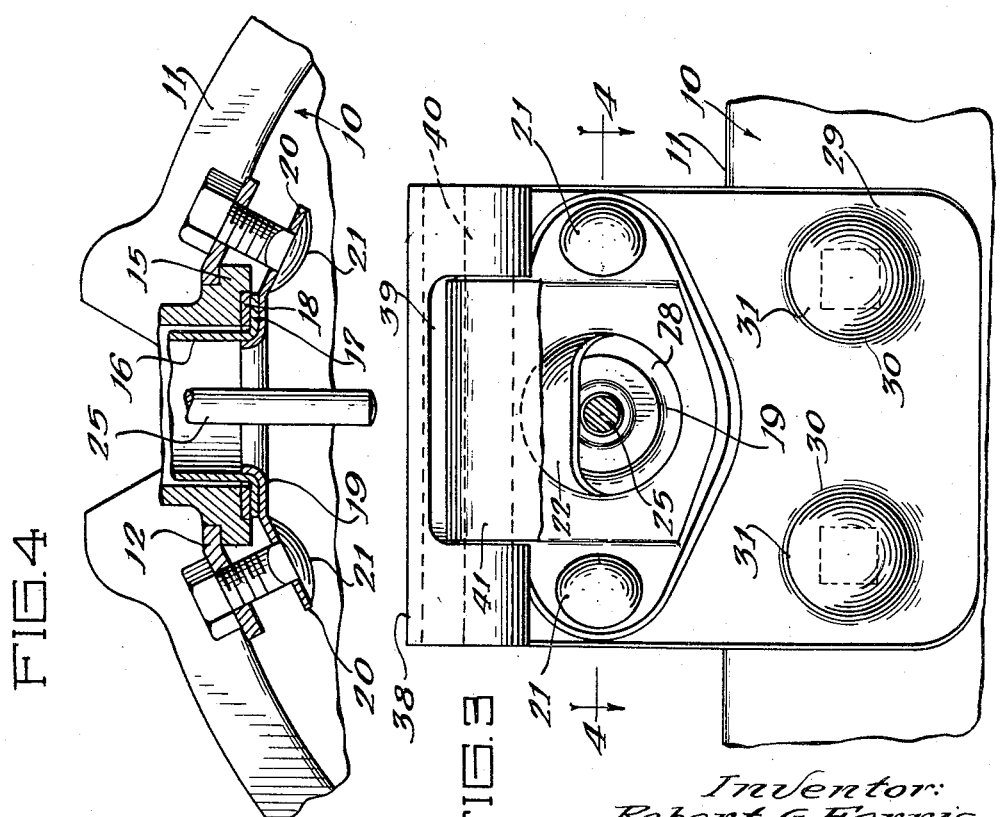
Inventor:
Robert G. Ferris
By: Schroeder, Hofgren,
Brady & Wegner
Attorney

United States Patent Office 2,764,960
Patented Oct. 2, 1956

2,764,960
ANIMAL OPERATED WATER BOWL

Robert G. Ferris, Harvard, Ill., assignor to Starline, Inc., a corporation of Illinois Application March 18, 1955, Serial No. 495,083

5 Claims. (Cl. 119—75)

This invention relates to an improved water bowl for livestock, and in particular it relates to a water bowl provided with improved means for adapting it to the various conditions found in different installations.

Livestock water bowls with nose paddles are commonly used in dairy barns where they are mounted on stall frame members within convenient reach of the cow in each stall. Customarily they have a water connection with an inlet valve which is controlled by a pivoted paddle against which the cow may press her nose to admit water to the bowl. Devices of this general character are very old and well known. There are two conditions which vary from barn to barn and the present invention permits a bowl to be so arranged as to meet the varying conditions. One condition is the location of the water supply pipe and the other is the normal pressure in the line.

Most dairy barns have a water supply pipe in either one of the two positions along the floor, or hung from the ceiling; and it is desirable that a livestock water bowl of the character just described be so arranged that it may be easily and inexpensively connected to an overhead water pipe or to either type of floor-level water pipe. The simpler floor installation is in the manger in front of the stall; while the neater and better installation is in a chase in the floor just behind the curb which separates the stall from the manger.

Insofar as applicant is aware, all livestock water bowls have heretofore been provided with a fixed valve assembly and a fixed fitting for connecting the valve assembly to the supply pipe. The fitting might extend up, or down, or to either side; but was fixed so that it could not be adjusted to suit the position of the water supply line. Applicant's assignee has formerly made a unit with a fixed T having an "up" or "down" connection piped straight into the "overhead" or "manger" supply pipe as the case might be, and a plug in the unused side of the T. However, this required two elbows to get to a "floor chase" pipe line behind the curb, in order to get around the stall post on which the bowl is hung. Similarly, a fixed fitting extending sideways required one elbow for any installation. With elbows at 40¢ to 65¢ apiece retail, this would add $10 or $15 to the farmer's cost of installing the water equipment for 20 stalls.

In accordance with the present invention in which the valve assembly is in an elbow which may be positioned at any desired angle, the unit requires only one elbow for a "floor chase" installation, or none for an "overhead" or "manger" installation. Thus, the present invention materially reduces installation cost in many cases.

In accordance with the present invention an elbow extends through a hole in an upstanding arm on the back of the bowl and has a flange on the inside of the arm so that it may be clamped to the arm. The valve mechanism is mounted in the elbow and has an axial plunger extending inwardly of the bowl wall so that the elbow may be turned in any direction with respect to the bowl without disturbing the position or operation of the valve.

Thus, the portion of the elbow outside the bowl may be turned in any desired direction for the most convenient connection to a nearby water pipe. In combination with the elbow containing a valve is a cooperating bracket which is positioned below the elbow and has side members extending rearwardly from the bowl for clamping attachment to an upright stall member. There is a space between the side members of the bracket which is large enough that if it is necessary to connect the elbow to a floor-level water pipe the elbow may be turned straight down and the pipe brought in between the side members of the clamp.

The invention is illustrated in a preferred embodiment in the accompanying drawings in which:

Fig. 1 is a fragmentary plan view foa water bowl constructed in accordance with the present invention;

Fig. 2 is a fragmentary section taken as indicated along the line 2—2 of Fig. 1;

Fig. 3 is a fragmentary section taken as indicated along the line 3—3 of Fig. 2;

Fig. 4 is a section taken as indicated along the line 4—4 of Fig. 3 with the valve spring and spring support omitted; and Fig. 5 is a section on a reduced scale taken as indicated along the line 5—5 of Fig. 2.

Referring to the drawings in greater detail, and referring first to Figs. 1 and 2, a water bowl indicated generally at 10 has an outturned flange 11 at its top margin, and has a valve support 12, a portion of which extends upwardly from the flange 11 and forms a marginal portion of the bowl. The support 12 has a downwardly extending mounting portion 29 inside the bowl in which are bosses 30 to provide flat seats for long carriage bolts 31 which extend parallel to one another flanking a mounting bracket, indicated generally at 32, and a post P on which the bowl is mounted. The bracket 32 has side members 33 and 34 which are formed from a single, generally U-shaped piece of sheet metal having a post engaging base 35 which joins the side members 33 and 34. The mounting bracket is completed by a clamp block 36 which slides onto the carriage bolts 31, so that drawing up nuts 37 onto the carriage bolts will firmly grip the pipe between the clamp block 36 and the base portion 35 of the bracket 32, and will firmly secure the bracket 32 between the post P and the bowl 10.

The valve support 12 has an opening 13 above the flange 11 on the bowl to receive a pipe elbow 14 which has at its forward end a flange 15 swivelly contacting the front surface of the valve support 12. A valve shell 16 mounted in the elbow has a flange 17 at its forward end which overlies a packing member 18 mounted at the front of the flange 15 of the elbow. A clamp 19 (see Fig. 4) has a flange extending into the valve body 16, and a pair of wing members 20 to receive bolts 21 by means of which both the valve body 16 and the elbow 14 are clamped firmly to the arm 12. Integral with the clamp 19 is a water deflector 22 which covers approximately the top half of the open forward end of the valve body 16.

The valve body 16 has a concave rear portion 23 with a central aperture 24 to receive a plunger 25 which extends forwardly through the opening 13 from a rubber valve plug 26 which may seat in the recess 23 to stop the flow of water through the opening 24. A coil compression spring 27 surrounds the plunger 25 between the recess 23 in the valve body 16 and a spring support 28 which is secured to the plunger 25 so as to be approximately flush with the forward end of the valve body 16.

As best seen in Fig. 1, the side members 33 and 34 of the bracket 32 are spaced apart a distance greater than the maximum external width of the elbow 14 outside the bowl. Thus, as seen in Fig. 7, the elbow may be positioned either turned up as shown in solid lines or may be rotated 180° so that the nipple 14a on the elbow extends directly down between the side members 33 and 34 of the bracket spacer or may extend horizontally in either direction as shown in broken lines in Fig. 7.

Extending forwardly from the valve bracket 12 is a paddle mounting tongue 38 which has laterally spaced eyes 39 at its outer end to accommodate a mounting pivot pin 40; and a paddle 41 has a hinge loop 42 surrounding the pin. The movement of the paddle is limited by abutment of the outer end of the paddle with the bottom of the bowl. On the rear of the paddle is a valve actuator 43 mounted on a rivet 44.

The foregoing detailed description is given for clearness of understanding only and no unnecessary limitations are to be understood therefrom, as some modifications will be obvious to those skilled in the art.

I claim:

1. In a water bowl for livestock: a bowl having a valve support forming a marginal portion thereof, said valve support having an opening therethrough; a one-piece pipe elbow in register with said opening and having a flange swivelly contacting the inner wall of said valve support and adapted to be connected to a source of water supply; a unitary valve mechanism secured in said elbow with an activating member extending toward the bowl; and clamp means operatively associated with said elbow and said valve support.

2. The device of claim 1 which includes a mounting bracket having arms which are in planes, flanking the pipe elbow said arms being separated by a distance greater than the maximum width of the elbow outside the bowl.

3. The device of claim 2 in which the valve support is a separate element having a mounting portion inside the bowl, and mounting bolts extend through said mounting portion and are operatively associated with the mounting bracket to clamp the valve support to the bowl and to clamp the bowl onto an upright post.

4. The device of claim 1 in which the valve mechanism has a flange inside the flange on the pipe elbow, and the clamp means overlies said flange to clamp the elbow to the valve support and the valve mechanism in the elbow.

5. The device of claim 4 in which the clamp means includes an integral water deflector extending across the upper portion of the pipe elbow.

References Cited in the file of this patent

UNITED STATES PATENTS

| | | |
|---|---|---|
| 1,402,653 | Rassmann | Jan. 3, 1922 |
| 1,402,654 | Rassmann | Jan. 3, 1922 |
| 1,584,362 | Fitzgerald | May 11, 1926 |
| 1,589,836 | Bulger | June 22, 1926 |
| 1,980,640 | Schneider | Nov. 13, 1934 |
| 2,260,817 | Anderson | Oct. 28, 1941 |